United States Patent
Klein et al.

(10) Patent No.: US 9,723,859 B2
(45) Date of Patent: Aug. 8, 2017

(54) METHOD FOR PRODUCING A HIGH PROTEIN FOOD

(71) Applicant: Erie Foods International, Inc., Erie, IL (US)

(72) Inventors: James M. Klein, Geneseo, IL (US); Craig Air, Geneseo, IL (US)

(73) Assignee: Erie Foods International, Inc., Erie, IL (US)

( * ) Notice: Subject to any disclaimer, the term of this patent is extended or adjusted under 35 U.S.C. 154(b) by 0 days.

(21) Appl. No.: 14/875,463

(22) Filed: Oct. 5, 2015

(65) Prior Publication Data

US 2016/0095332 A1  Apr. 7, 2016

Related U.S. Application Data

(60) Provisional application No. 62/059,355, filed on Oct. 3, 2014.

(51) Int. Cl.
| | |
|---|---|
| *A23C 9/00* | (2006.01) |
| *A23J 3/10* | (2006.01) |
| *A23J 1/22* | (2006.01) |
| *A23J 3/26* | (2006.01) |
| *A23C 9/15* | (2006.01) |

(52) U.S. Cl.
CPC . *A23J 3/10* (2013.01); *A23J 1/22* (2013.01); *A23J 3/265* (2013.01); *A23C 9/15* (2013.01)

(58) Field of Classification Search
CPC ....... A23C 9/15; A23J 1/22; A23J 3/10; A23J 3/265
USPC .......................... 426/580, 656, 657, 512, 516
See application file for complete search history.

(56) References Cited

U.S. PATENT DOCUMENTS

| | | |
|---|---|---|
| 2,437,150 A | 3/1948 | Berg |
| 3,903,308 A | 9/1975 | Ode |
| 3,978,244 A | 8/1976 | Sair |
| 4,315,954 A | 2/1982 | Kuipers et al. |
| 4,338,340 A | 7/1982 | Morimoto et al. |
| 4,650,685 A | 3/1987 | Persson et al. |
| 4,744,993 A | 5/1988 | Bisson et al. |
| 6,444,242 B1 | 9/2002 | Skelbaek et al. |
| 6,468,579 B1 | 10/2002 | Roussel et al. |
| 6,607,777 B1 | 8/2003 | Walsh et al. |
| 6,749,886 B2 | 6/2004 | Jones |
| 6,830,766 B2 * | 12/2004 | McCabe ................ A23G 1/305 426/302 |
| 7,220,442 B2 | 5/2007 | Gautam et al. |
| 7,235,276 B2 | 6/2007 | Allen et al. |
| 7,700,144 B2 | 4/2010 | Pandey et al. |
| 7,851,010 B2 | 12/2010 | Onwulata |
| 8,087,300 B2 | 1/2012 | Dautremont et al. |
| 8,293,297 B2 | 10/2012 | Orcutt et al. |
| 2005/0233059 A1 | 10/2005 | Harada et al. |
| 2006/0110516 A1 | 5/2006 | Holtus et al. |
| 2006/0279017 A1 | 12/2006 | Gersching et al. |
| 2007/0026129 A1 | 2/2007 | Pandey et al. |
| 2008/0279987 A1 | 11/2008 | Bisson et al. |
| 2008/0280006 A1 | 11/2008 | Onwulata |
| 2012/0064209 A1 | 3/2012 | Ardisson-Korat et al. |
| 2013/0256942 A1 | 10/2013 | Domaske |

FOREIGN PATENT DOCUMENTS

| | | |
|---|---|---|
| EP | 0051423 A2 | 5/1982 |
| EP | 0225770 A3 | 2/1989 |
| EP | 0431203 A1 | 6/1991 |
| EP | 0500182 A1 | 8/1992 |
| EP | 0393339 B1 | 8/1994 |
| EP | 1029457 A2 | 8/2000 |
| EP | 1059040 A1 | 12/2000 |
| EP | 1300083 A1 | 4/2003 |
| GB | 2085273 A | 4/1982 |
| NZ | 198338 A | 12/1984 |
| WO | 9617981 A1 | 6/1996 |
| WO | 0056171 A1 | 9/2000 |
| WO | 2006130025 A1 | 12/2006 |
| WO | 2006138039 A2 | 12/2006 |
| WO | 2007041470 A2 | 4/2007 |
| WO | 2008093342 A2 | 8/2008 |
| WO | 2008124620 A1 | 10/2008 |
| WO | 2011064241 A1 | 6/2011 |
| WO | 2011064242 A1 | 6/2011 |
| WO | 2014118265 A1 | 8/2014 |

OTHER PUBLICATIONS

PCT/US2015/054082; Notification of Transmittal of the International Search Report and the Written Opinion of the International Searching Authority, or the Declaration; International Filing Date:Oct. 5, 2015.

* cited by examiner

*Primary Examiner* — Leslie Wong

(74) *Attorney, Agent, or Firm* — Hamilton IP Law, PC; Jay R. Hamilton; Charles Damschen

(57) ABSTRACT

A high protein food may be produced via an extrusion process whereby acid casein is mixed with whey protein, alkali and water. Upon exiting the extruder, the mixture may be cut, dried, and/or tempered, milled and screened before being further processed or packaged. The final product may be configured as a crisp high protein food or a powdered high protein food. The protein content of the end product may be approximately 90-95% on a dry weight basis.

18 Claims, 9 Drawing Sheets

METHOD FOR PRODUCING A HIGH PROTEIN FOOD

CROSS REFERENCE TO RELATED APPLICATIONS

The present utility patent application claims priority from provisional U.S. Pat. App. No. 62/059,355 filed on Oct. 3, 2014, which application is incorporated by reference herein in its entirety.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX

N/A

BACKGROUND

The health consequences of frequently eating foods that are high in carbohydrates and/or unnatural fats have been widely reported in the last several years. Accordingly, foods that are high in protein have been found to be some of the healthiest options, and many consumers are subsequently seeking out such foods. Where milk proteins are included as part of a higher protein diet, vast improvements have been found with muscle protein synthesis, promoting satiety, preserving and increasing lean muscle mass, enhancing calcium retention and improving bone strength. Additionally, the more convenient a food product is to prepare and eat, the more likely consumers with busy lifestyles are to purchase and/or consume such a food product.

High protein food products that are convenient for consumers to prepare and eat that are currently available to consumers are often based on meat (e.g., beef jerky, poultry jerky, etc.), soy (e.g., roasted edamame, soy "milk", etc.), or cow's milk (e.g., casein, whey protein). However, prior art high protein foods based on cow's milk often require large amounts of sweeteners (either artificial or natural) so as to be palatable. Additionally, prior art high protein foods based on cow's milk do not provide a liquid cow's milk protein profile at high protein concentrations.

In the context of extruded food products, the addition of milk-derived protein often affects the food product in an undesirable manner. Such effects include but are not limited to contributing to an unpalatable food product, undesirable texture of the food product, and/or an undesirable density of the food product. Accordingly, a need exists for a food product with a high milk protein content that is palatable, and which has a desirable texture and density. In addition a powdered high protein food optimally would be homogeneous and have desirable solubility and heat stability.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
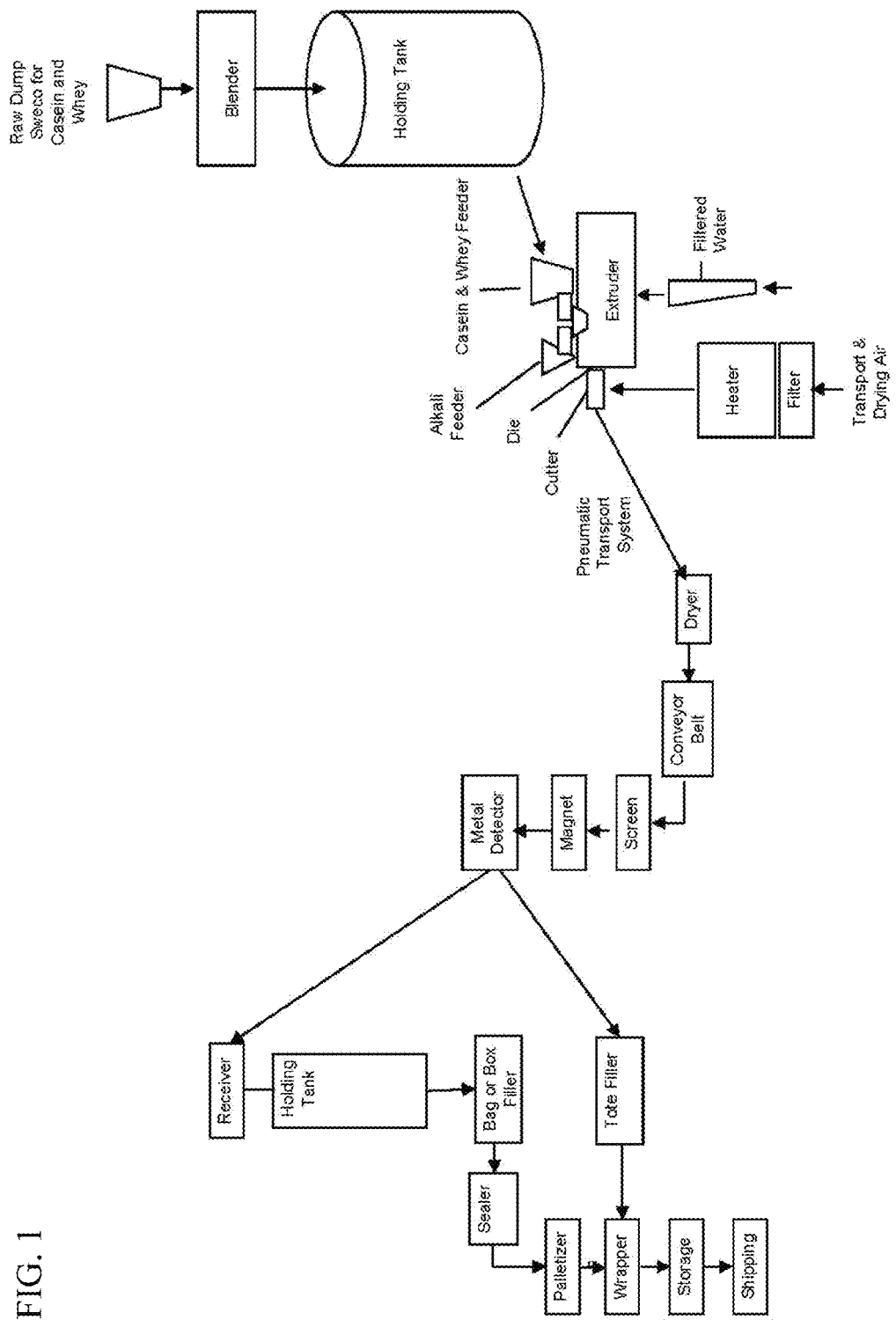
FIG. 1 is a schematic representation of another method for making a crisp high protein food according to the present disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment and/or aspect includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

Before the various aspects of the high protein food are explained in detail, it is to be understood that the present disclosure is not limited to the details of applications, processes, and/or parameters set forth in the following description or illustrated in the drawings. The high protein food is capable of other embodiments and of being practiced or of being carried out in various ways. Operational parameters included herein are for illustrative purposes only, and in no way limit the scope of the high protein food. The following detailed description is of the best currently contemplated modes of carrying out illustrative embodiments of the invention.

1. Illustrative Aspects for One Process for Making a High Protein Food

Illustrative aspects for one process for making a high protein food in accordance with the present disclosure is shown schematically in FIG. 1, wherein the high protein food may be configured as a crisp high protein food as described in detail below. Illustrative aspects for another process for making a high protein food in accordance with the present disclosure is shown schematically in FIG. 2, wherein the high protein food may be configured as a powdered high protein food as described in detail below. Although specific reference to operational parameters, equipment, unit operations and the like may be made in the foregoing description, shown in the accompanying drawings, and/or provided in any Appendices included herewith, it is to be understood that those constraints, parameters, and/or values are for illustrative purposes only, and other values and/or parameters may be used when carrying out other aspects of a process for making a high protein food without limiting the scope of the present disclosure unless so indicated in the following claims.

Figure 2:
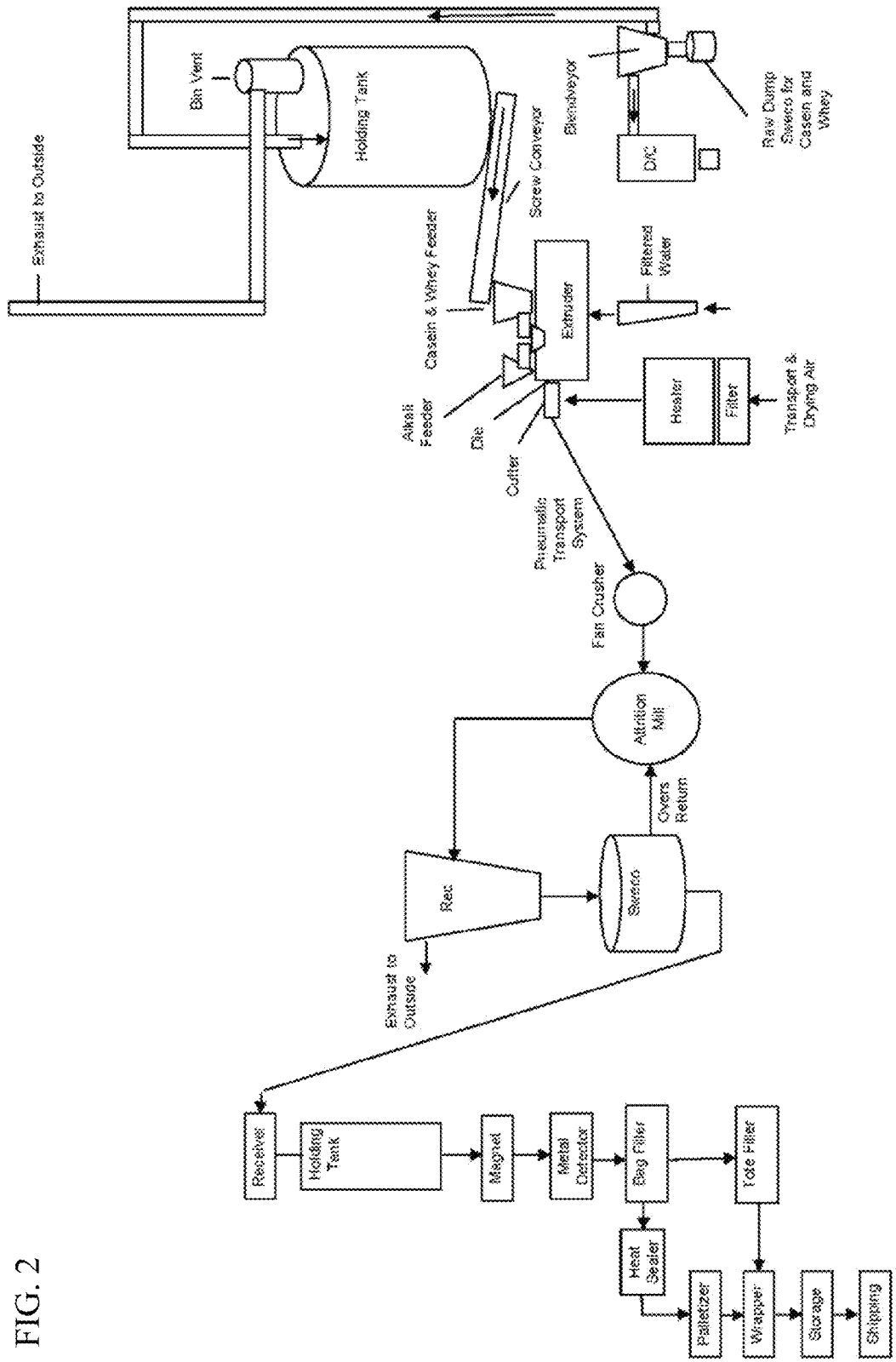
FIG. 2 is a schematic representation of one method for making a powdered high protein food according to the present disclosure.

In an aspect of a process for making a high protein food shown in FIG. 1, acid casein may be mixed with whey protein and an alkali. These components may be mixed and/or blended using any suitable method and/or structure, including but not limited to blending tanks, mixers, conveyors, and/or combinations thereof. The ingredients may be added individually, separately, and in liquid or dry forms without limitation unless so indicated in the following claims. It is contemplated that for the illustrative aspects, the moisture content of these components may be approximately 6-12% by weight. This mixture may then be introduced into an extruder. Water may also be introduced to the extruder and adjustments made to the alkali, which may cause the pH of the resulting mixture to be approximately neutral. It is contemplated that the water introduced to the extruder may be filtered and/or otherwise purified before it enters the extruder as shown in FIGS. 1 & 2.

It is contemplated that in an aspect of the method, water in the amount of 3-30% by weight may be added to the extruder. If the alkali was not added to the mixture in the previous step, it may be added to the extruder at this point. In an aspect, it is contemplated that the density of the casein and whey protein mixture and the density of the casein, whey protein, and alkali mixture may be from 0.4 to 0.8 g/ml loose and from 0.5 to 1.1 g/ml when packed. However, in another aspect of the present disclosure not pictured herein, wet curd casein or liquid whey protein may be added to the extruder in place of or in addition to solid acid casein or whey protein. In such an aspect, the ratio of solid protein mixed may be lower than if liquid protein is not used. Additionally, in such an aspect, all or a portion of the water necessary for the process may be provided via the liquid whey protein.

In an aspect, it is contemplated that the extruder may be configured as a twin, co-rotating screw extruder, but the extruder may be differently configured in other embodiments and/or aspects without limitation unless so indicated in the following claims. The feed rate of ingredients and water to the extruder will depend at least upon the size of the extruder, and it is contemplated that for some embodiments and/or aspects of a process for making a high protein food the screws speeds may be from 150 RPM to 300 RPM.

Generally, it is contemplated that for the illustrative process, the temperature of the mixture may increase as residence time within the extruder increases. In an aspect, the residence time of the mixture within the extruder may be from about 5 seconds to about 25 seconds, although the scope of the present disclosure is not so limited unless indicated in the following claims. Accordingly, the temperature range in or around the feed zone of the extruder may be approximately 5-60 C, and the temperature range in or around the product zones (or exit zones) may be approximately 40-120 C. However, heat exchangers may be employed to add or remove heat from the extruder (or product therein) at any point such that these values may be different for other aspects of the present process without limitation unless so indicated in the following claims.

As the resulting mixture exits the extruder, the mixture may expand such that the density of the product within the extruder is greater than the density thereof upon exiting the extruder. Additionally, a portion of the water content in the product may flash off due to the pressure differential between the internal portion of the extruder and the exterior of the extruder. If the desired final product is a crisp high protein food (one illustrative example of which is described in detail below), the product may be cut upon exiting the extruder, which may be done via a cutter engaged with the extruder. Additionally, different dies engaged with the extruder may impart different aspects to a crisp high protein food, as described in further detail blow. The cut product pieces may then be tempered and/or dried to achieve the desired final moisture content, which may be approximately 1-14% by weight according to an illustrative aspect. The protein content of the end product may be approximately 90-95% on a dry weight basis. At this protein level the product may be labeled a Milk Protein Isolate (MPI) per the American Dairy Products Institute Concentrated Milk Proteins Standard, which is attached hereto and made a part hereof as Appendix A.

In an aspect, the product may be tempered and/or dried using a fluidized bed dryer or an oven. As shown in FIGS. 1 & 2, both the process for producing the powdered high protein food and the crisp high protein food may include exposing the product to heated air for drying purposes when the product exits the extruder. Additionally, the product may be transported from the extruder via a pneumatic transport system, which system may be configured to remove a portion of moisture from the product during transport. In an aspect of a method for making a crisp high protein food (referring to FIG. 1), the pneumatic transport system may deliver the product to a dryer, which may be any suitable dryer for removing moisture from the crisp high protein food, including but not limited to microwave ovens, convection ovens, fluidized bed dryers, drum driers, forced air dryers, and/or combinations thereof.

Still referring to FIG. 1, the product may be transported from a dryer to a screen and product pieces within certain criteria (e.g., length, width, volume, etc.) may be diverted to a primary stream. The product may be exposed to a magnetic field to remove any magnetic materials and/or passed through a metal detector. The product may be placed in a holding tank for packaging and/or further processing, or they may be directly packaged for shipment and/or sale. It is contemplated that a crisp high protein food may be packaged in bags and/or boxes from approximately 25 pounds to approximately 65 pounds, or totes from about 300 pounds to about 800 pounds without limitation unless so indicated in the following claims.

In various aspects, the shape of the crisp high protein food may range from having an oval cross-sectional shape to a disk cross-sectional shape, it may be cylindrical in shape, spherical, it may have an irregular shape that is twisted and/or curved, it may be a combination of pieces, it may include voids or holes, it may be shaped with a pattern and/or may be flat like a conventional chip. In an aspect, the bulk density of a crisp high protein food may be from about 20 g/L to about 400 g/L. However, the scope of the present disclosure is not so limited unless so indicated in the following claims.

Generally, the texture of a crisp high protein food may vary according to several aspects of the method for producing the crisp high protein food. In one aspect, the crisp high protein food may be expanded after extrusion such that the texture thereof is puffy and/or cracker-like. In another aspect, the method may include tempering and/or drying such that the crisp high protein food has a slightly chewy texture. In yet another aspect, the method may include a tempering and/or drying step that results in the crisp high protein food a brittle and/or crunchy texture. Accordingly, the scope of the present disclosure is in no way limited by the specific texture of the crisp high protein food unless so indicated in the following claims.

Figure 3A:
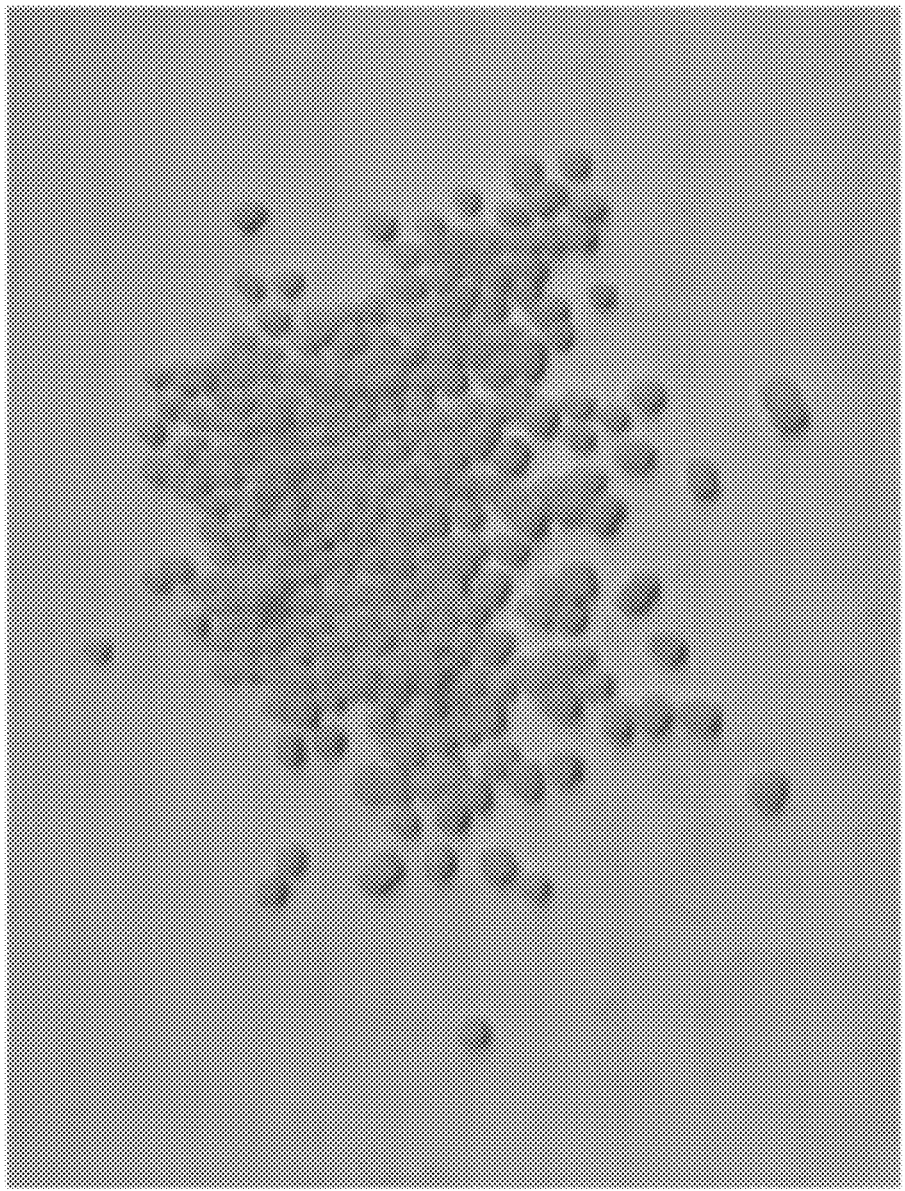
FIGS. 3A-3G show various aspects of a crisp high protein food.

Various illustrative shapes and relative sizes of a crisp high protein food are shown in FIGS. 3A-3G. As shown in FIG. 3A, one aspect of a crisp high protein food may be configured with a very small spherical and/or slightly cylindrical shape, wherein the average diameter thereof may be approximately 0.34 cm. The configuration of a crisp high protein food shown in FIG. 3A may be produced via an extruder with a round die opening of 1.0 mm.

Figure 3B:
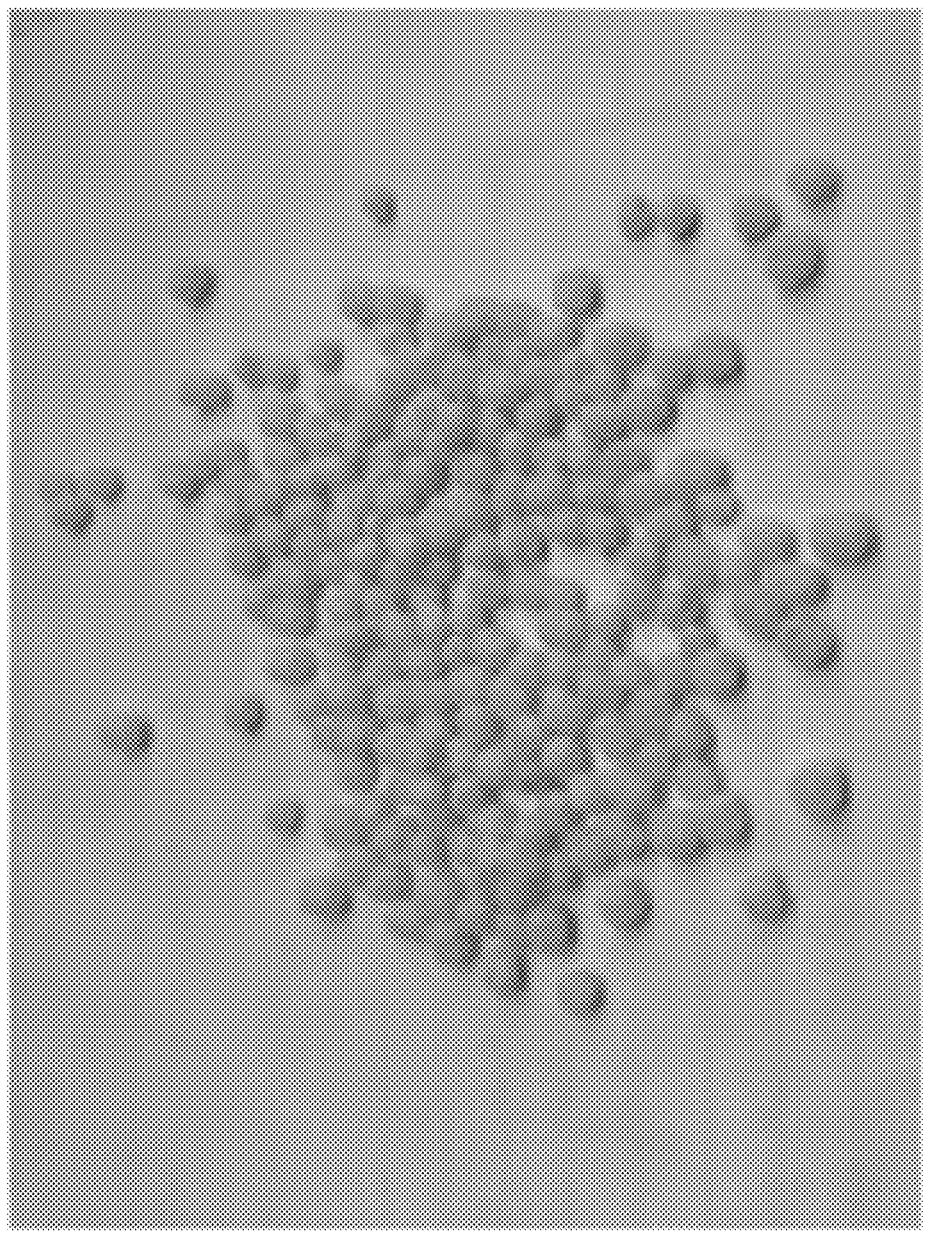

As shown in FIG. 3B, in another aspect of a crisp high protein food, the crisp high protein food may be configured with a small spherical shape, wherein the average diameter thereof may be approximately 0.45 cm. The configuration of a crisp high protein food shown in FIG. 3B may be produced via an extruder with a round die opening of 2.0 mm.

Figure 3C:
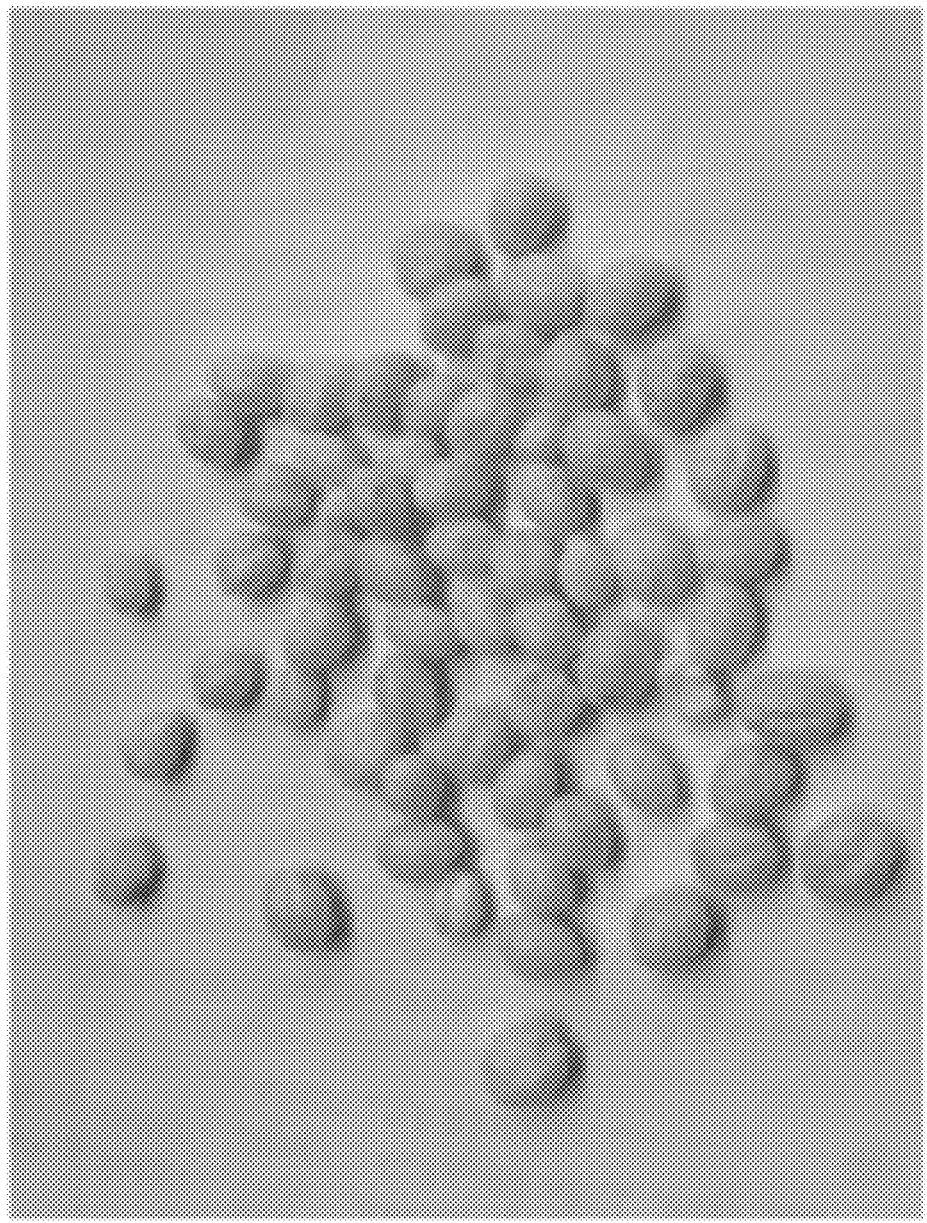

As shown in FIG. 3C, in another aspect the crisp high protein food may be configured with a medium oval shape, wherein the average width may be approximately 0.78 cm and the average length may be approximately 1.20 cm. The configuration of a crisp high protein food shown in FIG. 3C may be produced via an extruder with a slotted die opening having a 1.0 mm width and a 3.0 mm length.

Figure 3D:
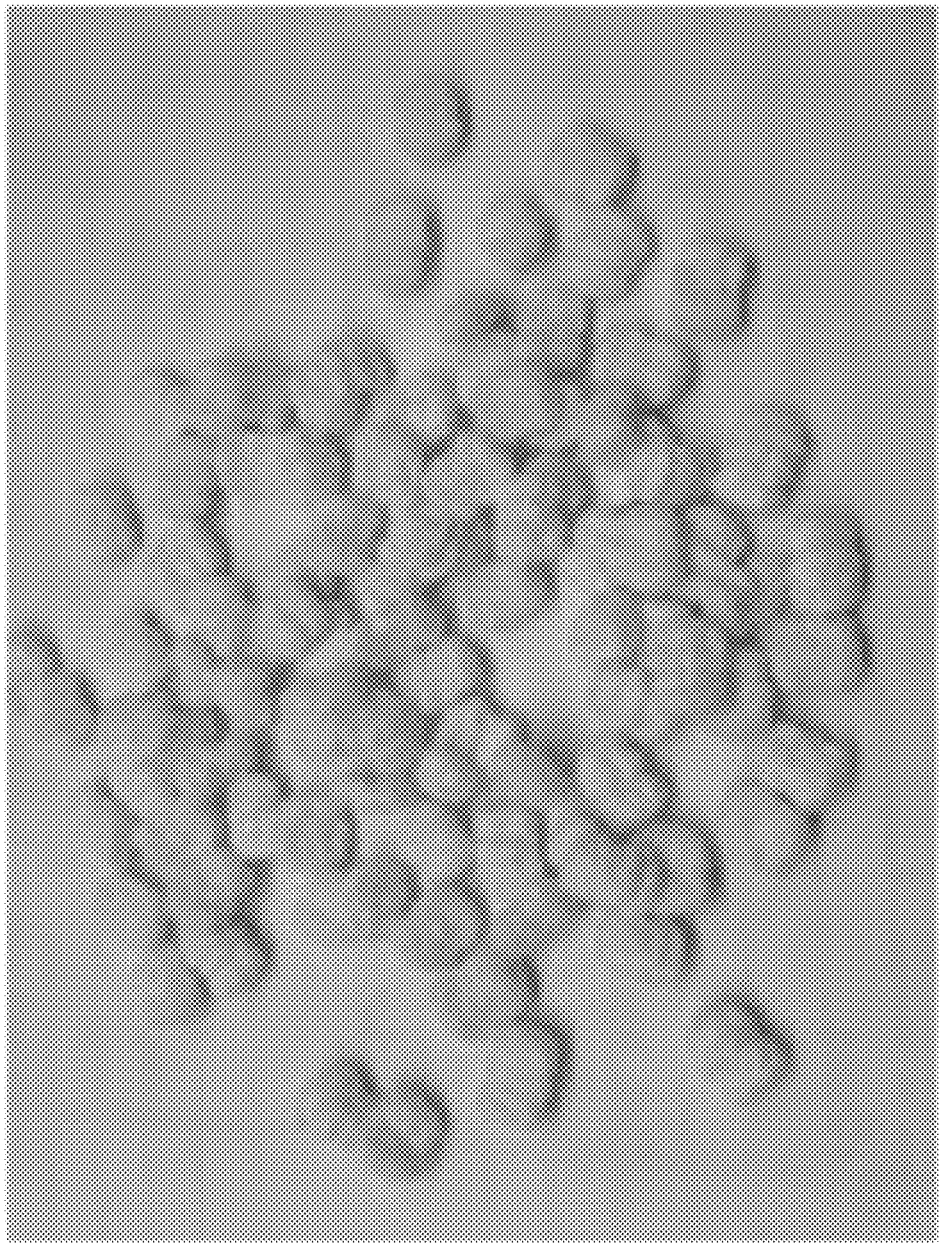

In an aspect of a crisp high protein food shown in FIG. 3D, the crisp high protein food may be configured with a medium combination cylinder shape, wherein the average width may be approximately 0.80 cm and the average length may be approximately 1.1 cm. The configuration of a crisp high protein food shown in FIG. 3D may be produced via an extruder with a slotted die opening having a 1.0 mm width and a 3.0 mm length.

Figure 3E:
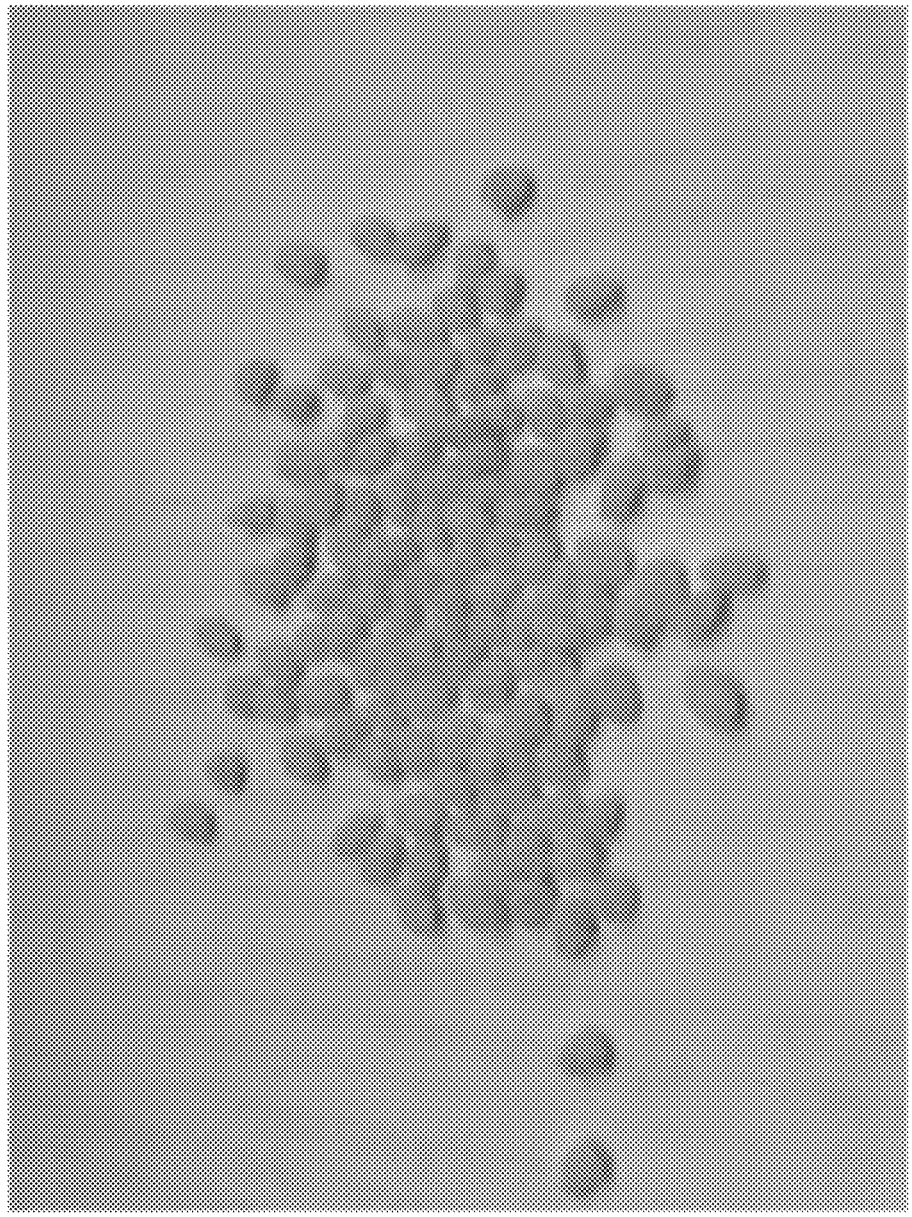

As shown in FIG. 3E, in a further aspect the crisp high protein food may be configured with another medium oval shape, wherein the average width may be approximately 0.53 cm and the average length may be approximately 0.70 cm. The configuration of a crisp high protein food shown in FIG. 3E may be produced via an extruder with a slotted die opening having a 1.0 mm width and a 3.0 mm length.

Figure 3F:

In another aspect shown in FIG. 3F, the crisp high protein food may be configured with a large cylinder shape, wherein the average width may be approximately 0.85 cm and the average length may be approximately 1.38 cm. The configuration of a crisp high protein food shown in FIG. 3F may be produced via an extruder with a round die opening having a 3.2 mm diameter.

Figure 3G:
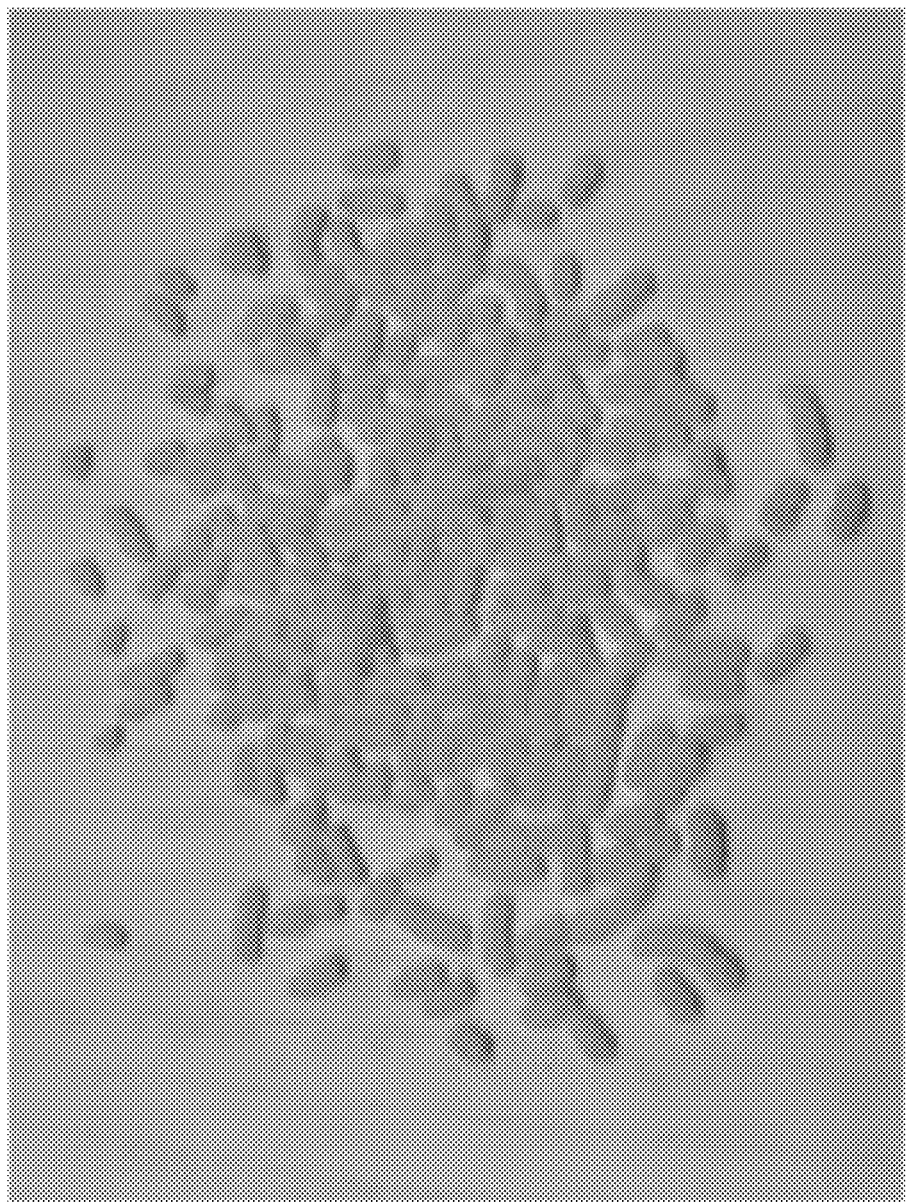

Another aspect of a crisp high protein food is shown in FIG. 3G, wherein the crisp high protein food may be configured with a very small cylinder shape, and wherein the average width may be approximately 0.2 cm and the average length may be approximately 0.82 cm. The configuration of a crisp high protein food shown in FIG. 3G may be produced via an extruder with a round die opening having a 1.0 mm diameter.

Accordingly, the specific shape of the crisp high protein food may depend at least upon the specific die and/or extruder used, and therefore in no way limits the scope of the present disclosure unless so indicated in the following claims. For example, in one aspect the shape of the crisp high protein food may be similar to that of Rice Crispies®, in another aspect thereof the shape may be similar to that of Cheetos®, and in still another aspect thereof the shape may be similar to that of Kix® cereal. Additionally, the scope of the present disclosure is not limited by the specific constraints (such as moisture content, shape, and/or density of the final product), operational parameters, equipment (such as the extruder, die used therewith, etc.), etc. disclosed herein unless so indicated in the following claims. Additional processing parameters for various aspects of a crisp high protein food are shown in Appendix F, which is attached hereto and made a part of this disclosure.

If the desired final product is a powdered high protein food (illustrative aspects of which are described in detail below), the product may be cut, tempered, and then further dried and milled (or ground) to the desired characteristics. In one aspect, cut product may be tempered at a first temperature and then then simultaneously milled (or ground) and dried to the desired moisture content of the final product prior to packaging.

Referring specifically to FIG. 2, the pneumatic transport system previously described may transport the product to a fan crusher, which may be configured to reduce the average particle size of the product. In an aspect, the fan crusher may be configured with a screen size of ¾ of an inch. However, any suitable structure and/or method may be employed to reduce the average particle size of the product, and the scope of the present disclosure is not limited to fan crushers unless so indicated in the following claims. After the fan crusher, the product may be placed in a mill (which may be an attrition mill) to reduce the average particle size of the product. In an aspect, the attrition mill may be configured with an intensity of 57%, a fan set point of 40 Hz, and a temperature set point of 65 degrees Celsius. However, any suitable structure and/or method may be employed to reduce the average particle size of the product, and the scope of the present disclosure is not limited to mills and/or mills with the foregoing operational parameters unless so indicated in the following claims.

The product may exit the mill via fluidic pressure, which may transport the product to a solid-gas separator, wherein the gas may be exhausted to the atmosphere and the solid may be placed in a sorting machine (which may be a sifter). In one aspect, the sorting machine may be configured as a Sweco sifter having a screen size of 34T (595 microns). However, the scope of the present disclosure is not so limited unless so indicated in the following claims. The sorting machine may be configured such that a first product stream comprising particle pieces under certain criteria (e.g., length, width, volume, etc.) may be transported to a receiver, and such that a second product stream comprising particle pieces over certain criteria (e.g., length, width, volume, etc.) may be returned to the mill for further average particle size reduction. Although an aspect in the illustrative method shown in FIG. 2 includes two average-particle-size reducing steps (a fan crusher and a mill), the scope of the present disclosure is not so limited, and any number and/or type of average-particle-size reducing methods or apparatuses may be used without limitation unless indicated in the following claims.

Still referring to FIG. 2, the first product stream may be positioned in a holding tank. The first product stream may be exposed to a magnetic field to remove any magnetic materials and/or passed through a metal detector. The product stream may then be packaged for shipment and/or sale. It is contemplated that a powdered high protein food may be packaged in bags and/or boxes from approximately 25 pounds to approximately 65 pounds, or totes from about 300 pounds to about 2204.6 pounds without limitation unless so indicated in the following claims. Additional processing parameters for various aspects of a powdered high protein food are shown in Appendix G, which is attached hereto and made a part of this disclosure.

In one aspect, the final moisture content of the product may be approximately 0.5-12% by weight without limitation, and the milling, grinding, and/or drying process may utilize any suitable structure and/or method to achieve the desired characteristics of the final product. The specific particle and/or average particle size for any aspect of a powdered high protein food may vary without limiting the scope of the present disclosure unless so indicated in the following claims. However, in one aspect it is contemplated that many applications may require a particle and/or average particle size in the range of 70 to 600 microns. Accordingly, a sifter may be used to achieve the desired particle size and/or average particle size for the final product.

Other ingredients may be extruded with the high protein food. Accordingly, the ingredients that may be introduced to the extruder include, but are not limited to, acid casein, lactic acid casein, rennet casein, sodium caseinate, calcium caseinate, micellar casein, milk protein concentrate (liquid or dried), milk protein isolate (liquid or dried), fresh curd casein (wet), whey protein concentrate (liquid or dried), whey protein isolate (liquid or dried), calcium hydroxide, sodium hydroxide, sodium bicarbonate, potassium bicarbonate, ammonium hydroxide, sodium citrate.

2. Illustrative Aspects a Powdered High Protein Food

Illustrative aspects of a powdered high protein food (which may be produced using the illustrative aspects of a process shown schematically in FIG. 2) will now be described. A typical product data sheet for an illustrative aspect of a powdered high protein food is shown in Appendix C, which is attached hereto and made a part hereof. A composition analysis, nutritional analysis, mineral analysis, and microbiological analysis for illustrative aspects of a powdered high protein food is provided in Appendix D, which is attached hereto and made a part hereof. Also shown in Appendix D are illustrative applications, functionality, packaging, and storage options for various illustrative aspects of a powdered high protein food. As is evident from Appendices C and D, illustrative aspects of a powdered high protein food may include a protein profile that is substantially similar to that of typical cow's milk (e.g., the protein may be approximately 80% casein-based and approximately 20% whey-based). However, other ratios of casein-based protein to whey-based protein may be used without limiting the scope of the present disclosure unless so indicated in the following claims.

As will be appreciated by a person of ordinary skill in the art, the various values in Appendices C and D for the composition analysis, nutritional analysis, mineral analysis, and microbiological analysis are for illustrative purposes only and are in no way limiting to the scope of the powdered high protein food unless so indicated in the following claims. Those values may be manipulated during the production process, and may be dictated based on the final application of the powdered high protein food. For example, if the end product that includes a powdered high protein food is a nutrition bar, it may be desirable to add protein from other non-milk sources, calcium, other minerals, vitamins, and/or other supplements per daily recommended values and/or market considerations.

In a composition analysis, nutritional analysis, mineral analysis, and microbiological analysis for another illustrative aspect of a powdered high protein food, the mineral composition for the powdered high protein food may be different than that for the powdered high protein food in Appendices C and D. For example, Appendix H, which is attached hereto and made a part hereof, provides a complete nutritional analysis for various aspects of a powdered high protein food. However, the specific values, ratios, and/or components disclosed in Appendix I in no way limit the scope of the present disclosure unless so indicated in the following claims. Accordingly, the specific mineral and/or microbiological content, and/or the specific compositional analysis of the powdered high protein food in no way limits the scope of the present disclosure unless so indicated in the following claims.

As mentioned, illustrative aspects of a powdered high protein food may be produced via the previously described illustrative method for making a high protein food. However, other processes and/or methods may be used without limitation. As explained below for a final product crisp high protein food, the density of a final product powdered high protein food may vary from one aspect to the next, which variation may be at least based upon different values for process parameters. However, for the illustrative aspects of a powdered high protein food it is contemplated that the density may be from 0.2 to 0.7 g/ml when loose and from 0.3 to 0.9 g/ml when packed without limitation unless so indicated in the following claims.

3. Illustrative Aspects of a Crisp High Protein Food

Illustrative aspects of a crisp high protein food (which may be produced using the illustrative aspects of a process shown schematically in FIG. 1) will now be described. A typical product data sheet for an illustrative aspect of a crisp high protein food is shown in Appendix B, which is attached hereto and made a part hereof. A typical composition analysis, nutritional analysis, mineral analysis, and microbiological analysis for illustrative aspects of a crisp high protein food is provided in Appendix E, which is attached hereto and made a part hereof. Also shown in Appendix E are illustrative applications, functionality, packaging, and storage options for the illustrative aspects of a crisp high protein food. As is evident from Appendix E, the illustrative aspects of a crisp high protein food may include a protein profile that is substantially similar to that of typical cow's milk (e.g., the protein may be approximately 80% casein-based and approximately 20% whey-based). However, other ratios of casein-based protein to whey-based protein may be used without limiting the scope of the present disclosure unless so indicated in the following claims. For example, Appendix I, which is attached hereto and made a part hereof, provides a complete nutritional analysis for various aspects of a powdered high protein food. However, the specific values, ratios, and/or components disclosed in Appendix I in no way limit the scope of the present disclosure unless so indicated in the following claims.

As will be appreciated by a person of ordinary skill in the art, the various values in Appendix E for the composition analysis, nutritional analysis, mineral analysis, and microbiological analysis are for illustrative purposes only and are in no way limiting to the scope of the crisp high protein food unless so indicated in the following claims. Those values may be manipulated during the production process, and may be dictated based on the final application of the crisp high protein food. For example, if the end product that includes a crisp high protein food is a snack product or nutrition bar, it may be desirable to add other ingredients, including but not limited to minerals, vitamins, and/or other supplements per daily recommended values and/or market considerations. Accordingly, the specific mineral and/or microbiological content, and/or the specific compositional analysis of the crisp high protein food in no way limits the scope of the present disclosure unless so indicated in the following claims.

As mentioned, the illustrative aspects of a crisp high protein food may be produced via the previously described illustrative aspects of one method for making a high protein food. However, other processes and/or methods may be used without limitation unless so indicated in the following claims. Applicant has found that the density of a final product crisp high protein food may vary depending on various factors, including but not limited to the size and shape of individual morsels as well as the water content added during the extrusion process and the moisture content of the final product. It is contemplated that many aspects of the crisp high protein food may have an average density of 0.01-0.50 g/ml.

Having described the preferred embodiments, other features of the high protein food and method for producing a high protein food will undoubtedly occur to those of ordinary skill in the art, as will numerous modifications and alterations in the embodiments and aspects as illustrated herein, all of which may be achieved without departing from the spirit and scope of the present disclosure. Accordingly, the methods and embodiments pictured and described herein are for illustrative purposes only and in no way meant to limit the scope of the claims unless so indicated.

The preceding constraints, examples, compositions, analyses, etc. and configurations in any of the aspects disclosed and described herein are for illustrative purposes only, and are in no way limiting to the scope of any of the systems and/or methods as disclosed and claimed herein. Furthermore, the various high protein foods, processes, methods, aspects, and/or embodiments disclosed or described herein may be implemented in conjunction with one another or independently from one another. Accordingly, the presence or absence of other subject matter that may be complementary to the present disclosure in no way limits the scope of the high protein food and/or methods for producing high protein foods unless so indicated in the following claims.

Any of the various features for a crisp high protein food, powdered high protein food, method for making the crisp or powdered high protein food, and/or components of any of the foregoing may be used alone or in combination with one another (depending on the compatibility of the features) to achieve the desired characteristics of an end product having a high protein food as a component thereof. Accordingly, an infinite number of variations of the high protein food and method for making same. All of these different combinations constitute various alternative aspects of the high protein food and/or methods for making same. The embodiments described herein explain the best modes known for practicing the high protein food and will enable others skilled in the art to utilize the same. The claims are to be construed to include alternative embodiments to the extent permitted by the prior art. Modifications and/or substitutions of one feature for another in no way limits the scope of the high protein food and/or component thereof unless so indicated in the following claims.

It should be noted that the present systems and/or methods are not limited to the specific embodiments described herein, but is intended to apply to all similar foods and/or methods for making a high protein food. Modifications and alterations from the described aspects and/or embodiments will occur to those of ordinary skill in the art without departure from the spirit and scope of the present systems and/or methods unless so indicated in the following claims.

What is claimed is:

1. A method for producing a high protein food, said method comprising the steps of:
    a. creating a mixture of from 65 to 85 percent by weight of a casein protein and from 15 to 35 percent by weight of a whey protein;
    b. introducing said mixture into an extruder;
    c. adding water to said extruder to create a second mixture such that said second mixture is from 3 to 30 percent by weight water;
    d. forcing said second mixture through a die engaged with said extruder to create a plurality of cut pieces;
    e. allowing said second mixture to expand in an environment with ambient pressure and temperature; and,
    f. removing moisture from said plurality of cut pieces such that the moisture content of said plurality of cut pieces is from 0.5% (one-half percent) to 12% (twelve percent) by weight, wherein a protein content of said plurality of cut pieces is 90% (ninety percent) or greater by weight, and wherein said high protein food produced by said method does not include a protein source other than said casein protein and said whey protein.

2. The method according to claim 1 wherein said mixture has a moisture content from 3% (three percent) to 13% (thirteen percent) by weight.

3. The method according to claim 2 wherein said extruder is further defined as being a twin, co-rotating screw extruder.

4. The method according to claim 3 further comprising the step of removing heat energy from said second mixture.

5. The method according to claim 4 wherein said protein content is further defined as comprising from 15% (fifteen percent) to 35% (thirty-five percent) by weight whey protein and from 65% (sixty-five percent) to 85% (eighty-five percent) by weight casein.

6. The method according to claim 5 wherein said plurality of cut pieces is further defined as having a bulk density from about 20 g/L to about 400 g/L.

7. The method according to claim 5 wherein said method further comprises the step of milling said plurality of cut pieces into a powder.

8. The method according to claim 7 wherein said powder is further defined as having a bulk density from about 0.2 g/ml to about 0.9 g/ml.

9. The method according to claim 5 wherein said method is further defined such that a residence time of said mixture within said extruder is greater than 4 seconds.

10. The method according to claim 1 wherein said protein content of said plurality of cut pieces is further defined as having a casein-to-whey ratio substantially equal to that of cow's milk.

11. A method for producing a high protein food, said method comprising the steps of:
   a. creating a mixture of from 65 to 85 percent by weight of a casein protein and from 5 to 40 percent by weight of a whey protein;
   b. introducing said mixture into an extruder;
   c. adding water to said extruder to create a second mixture such that said second mixture is from 3 to 30 percent by weight water;
   d. forcing said second mixture through a die engaged with said extruder to create a plurality of cut pieces;
   e. allowing said second mixture to expand in an environment with ambient pressure and temperature; and,
   f. removing moisture from said plurality of cut pieces such that the moisture content of said plurality of cut pieces is from 0.5% (one-half percent) to 12% (twelve percent) by weight, wherein a protein content of said plurality of cut pieces is 75% (seventy-five percent) or greater by weight, and wherein said high protein food produced by said method does not include a protein source other than said casein protein and said whey protein.

12. The method according to claim 11 wherein said mixture has a moisture content from 3% (three percent) to 13% (thirteen percent) by weight.

13. The method according to claim 11 wherein said protein content is further defined as comprising from 15% (fifteen percent) to 35% (thirty-five percent) by weight whey protein and from 65% (sixty-five percent) to 85% (eighty-five percent) by weight casein.

14. The method according to claim 13 wherein said plurality of cut pieces is further defined as having a bulk density from about 20 g/L to about 400 g/L.

15. The method according to claim 11 wherein said protein content of said plurality of cut pieces is further defined as having a casein-to-whey ratio substantially equal to that of cow's milk.

16. The method according to claim 11 wherein said method further comprises the step of milling said plurality of cut pieces into a powder.

17. The method according to claim 1 wherein said casein protein is further defined as acid casein and wherein said method further comprises the step of adding an alkali to said mixture until a pH value of said mixture is approximately neutral.

18. The method according to claim 11 wherein said casein protein is further defined as acid casein and wherein said method further comprises the step of adding an alkali to said mixture until a pH value of said mixture is approximately neutral.

* * * * *